INVENTORS H.J. MICHAEL
R.E. WATSON, JR.
BY James W. Falk
ATTORNEY

ESTABLISHING OF DATA CONNECTION BETWEEN DATA SET S1 AND DATA SET S2

United States Patent Office 3,335,226
Patented Aug. 8, 1967

3,335,226
COMBINED TELEPHONE AND DATA SWITCHING SYSTEM

Henry J. Michael and Robert E. Watson, Jr., Rumson, N.J., assignors to Bell Telephone Laboratories, Incorporated, New York, N.Y., a corporation of New York Filed Sept. 27, 1963, Ser. No. 312,120
15 Claims. (Cl. 179—2)

ABSTRACT OF THE DISCLOSURE

A communication switching system is arranged to provide an audio frequency communication path through a standard switching network between two stations and also to provide an independent path through another switching network for conveying high frequency electrical signals. The independent path through the other switching network is enabled in response to a coded pattern of control signals generated by the closure of the audio frequency path through the standard switching network.

Figure 1:
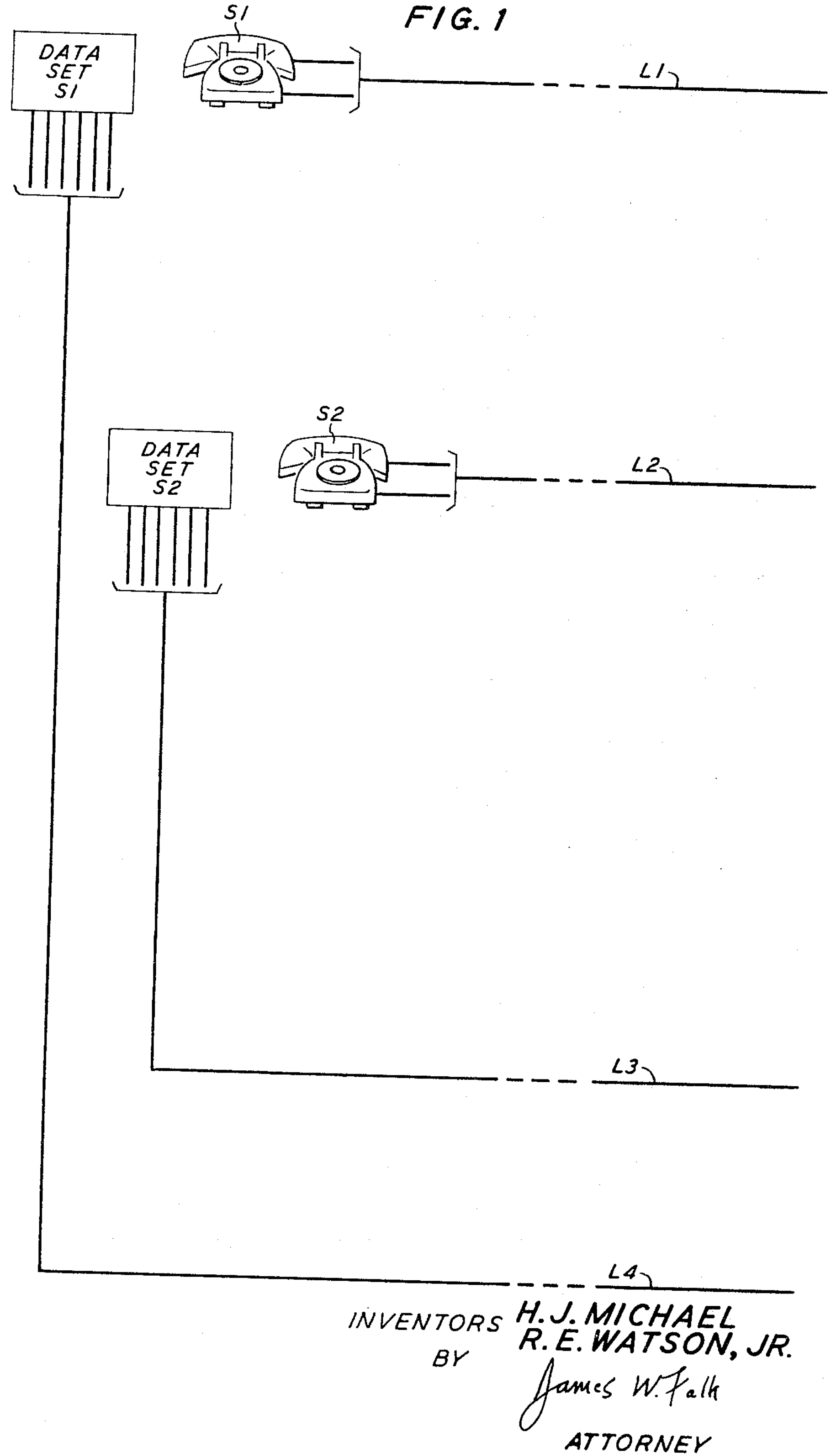
Figure 2:
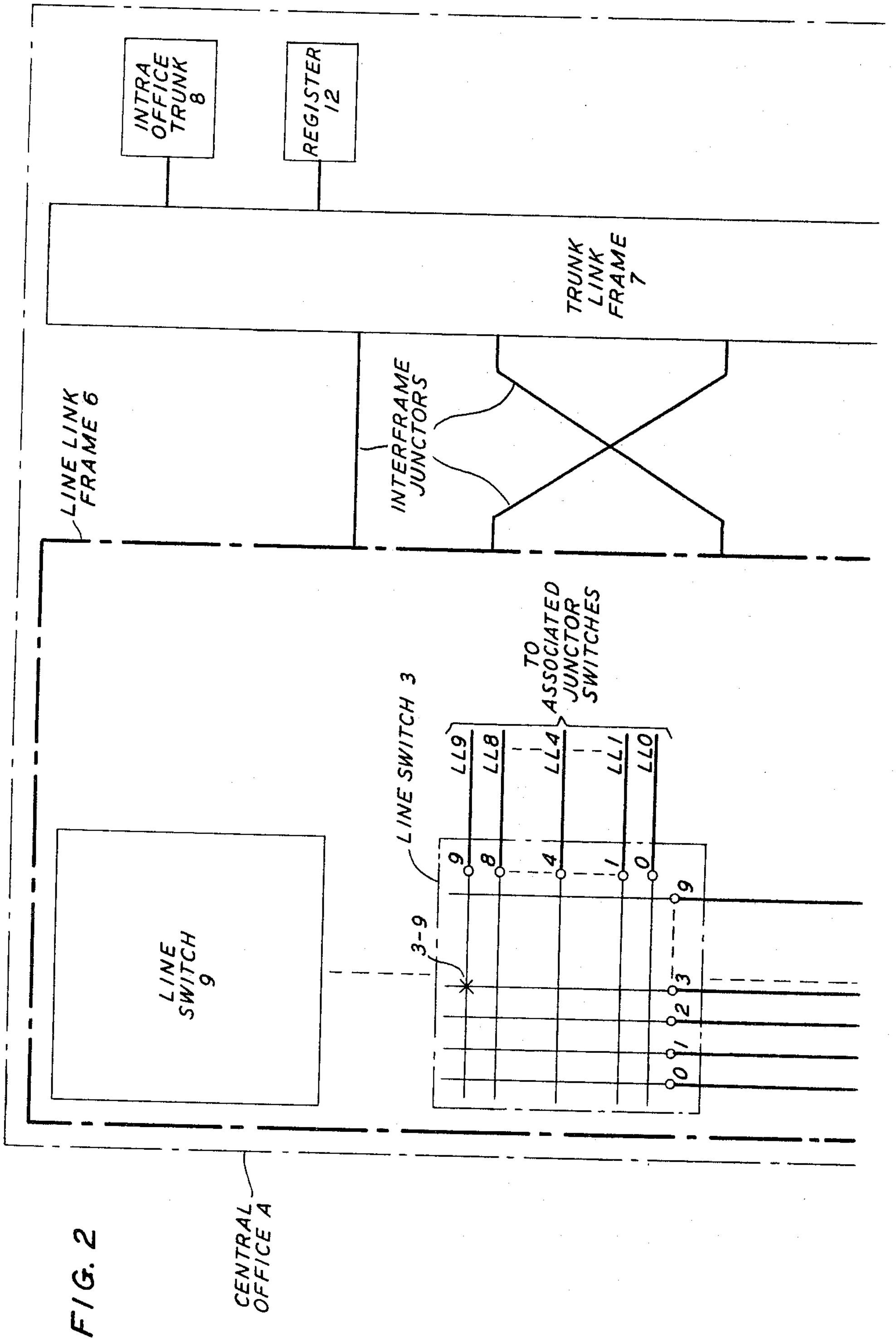
Figure 3:
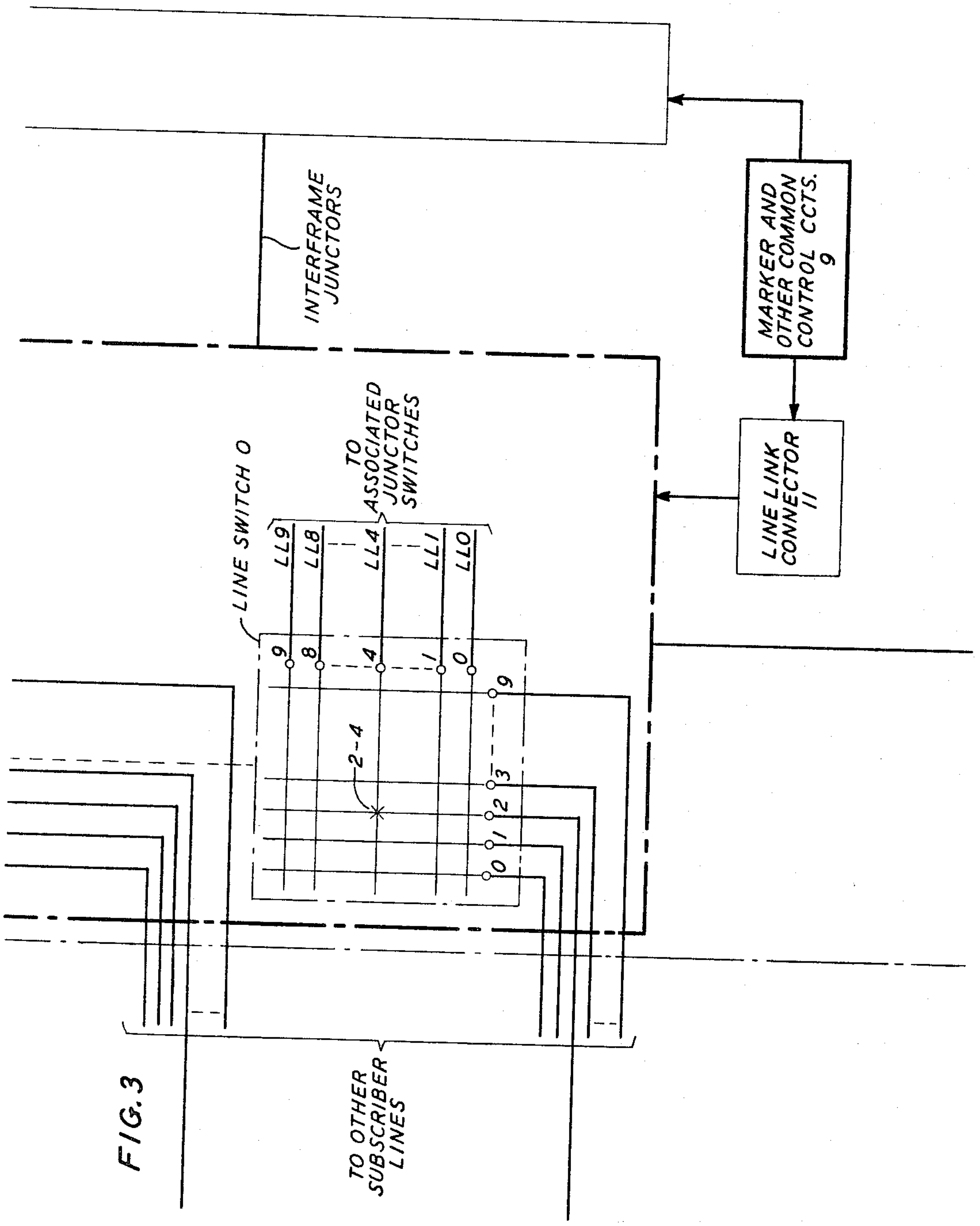

This invention relates generally to communication systems and particularly to communication systems which are operative to complete voice transmission paths and data trannmission paths between stations served by such systems. More particularly, this invention relates to control equipment which is automatically effective to complete an independent data transmission path between calling and called stations in response to the completion of a related voice transmission path between such stations.

Extensive development and improvement of telephone switching systems in recent years has resulted in nationwide automation of telephone voice communication connections. For example, it is possible today for most telephone subscribers to cause completion of a connection without human intervention to a called subscriber several thousand miles away, as easily as to complete such a connection to a nearby neighbor.

Concurrent with the development of telephone systems has been the perfection of data processing equipment which is operative to perform both simple and complex mathematical operations at speeds far surpassing human capability. Such data processing machines are in many instances also capable of communicating with each other in order to perform their designed functions. This communication is accomplished in the lanuage of such machines; for example, by high frequency electrical signals.

It would appear upon first consideration that the existing telephone switching network would be readily operable to provide communication paths between such machines. However, though the telephone network is fully automated, human control in the form of the well-known dialed or pulsed signals is still required in order to select the proper called station at the proper time. Another more significant problem which prevents full utilization of the telephone networks' ability to complete communication paths between such machines is presented by the aforesaid language of the machines. It is, of course, obvious that telephone communication paths and the apparatus associated therewith are, in general, designed for the transmission of electrical signals in the audio frequency range. Accordingly, such telephone communication paths offer undesired inductive and capacitive effects at the significantly higher frequency range required by data transmission equipment.

In view of the foregoing, an object of this invention is to provide an arrangement for interconnecting data processing equipment which may readily be incorporated in existing telephone switching systems.

A further object is to provide an arrangement for interconnecting data processing equipment which is automatically operative in response to the establishment of a connection in the conventional manner between two associated telephone stations.

A further object is to provide an arrangement for causing the completion of a data transmission connection in response to the completion of a voice transmission connection, wherein the equipment associated with the arrangement is of extremely simple and economical construction.

Another object is to provide this control equipment in a simple and expedient manner without necessitating the introduction of complex changes in priorly existing central office equipment.

These and other objects of the invention are attained in accordance with an exemplary embodiment wherein a crossbar switch field, which is operative to complete voice communication paths between calling and called stations, is arranged to control an associated high frequency crossbar switch field. A connection is completed between a calling and called station through the conventional crossbar switch field in the usual manner. Upon closure of the conventional crossbar switch crosspoints associated with the calling and called lines, respectively, a unique code is generated which is operative to enable a predetermined singular crosspoint in the high frequency crossbar switch field. The closure of the aforesaid singular crosspoint completes an independent data communication path between two data transmission sets each of which is associated with the respective called and calling stations. In the embodiment, the data communication path may advantageously comprise six conductors; a first pair for transmission in one direction; a second pair for transmission in the other direction; and a third pair for contol signaling. The voice communication path may advantageously comprise the well-known two-conductor line.

Thus, for example, voice communication may ensue between a subscriber at a calling station and a subscriber at a called station prior to or during the functioning of the respectively associated data sets. As will be more apparent hereinafter, the continuity of both the voice and data connection is maintained under control of the called and calling station subsets. Therefore, upon the on-hook condition of either the caller or calling subset, the voice connection releases and causes the release of the associated data connection.

Accordingly, it is a feature of this invention that equipment is provided to enable a primary switching network to complete connections between calling and called stations and to thereby generate a distinct code which is operative to cause the enablement of a related auxiliary switching network.

It is another feature of this invention that a related switching network is provided with equipment which is operative in response to a distinct series of signals generated by a completed connection through a primary switching network for causing the completion of another connection through the related network.

Another feature of this invention is that a distinct connection through a related switch field is maintained only in response to the continued enablement of a related connection through a primary switch field.

Another feature of this invention is that equipment is provided which is operative in response to the completion of an initial connection between certain stations served by a switching system to cause the completion of another connection between equipment associated with, but not connected to, such stations; wherein such other connection is enabled only when the aforesaid initial connection is originated by predetermined ones of the aforesaid certain stations.

Figures 4, 5, 8:
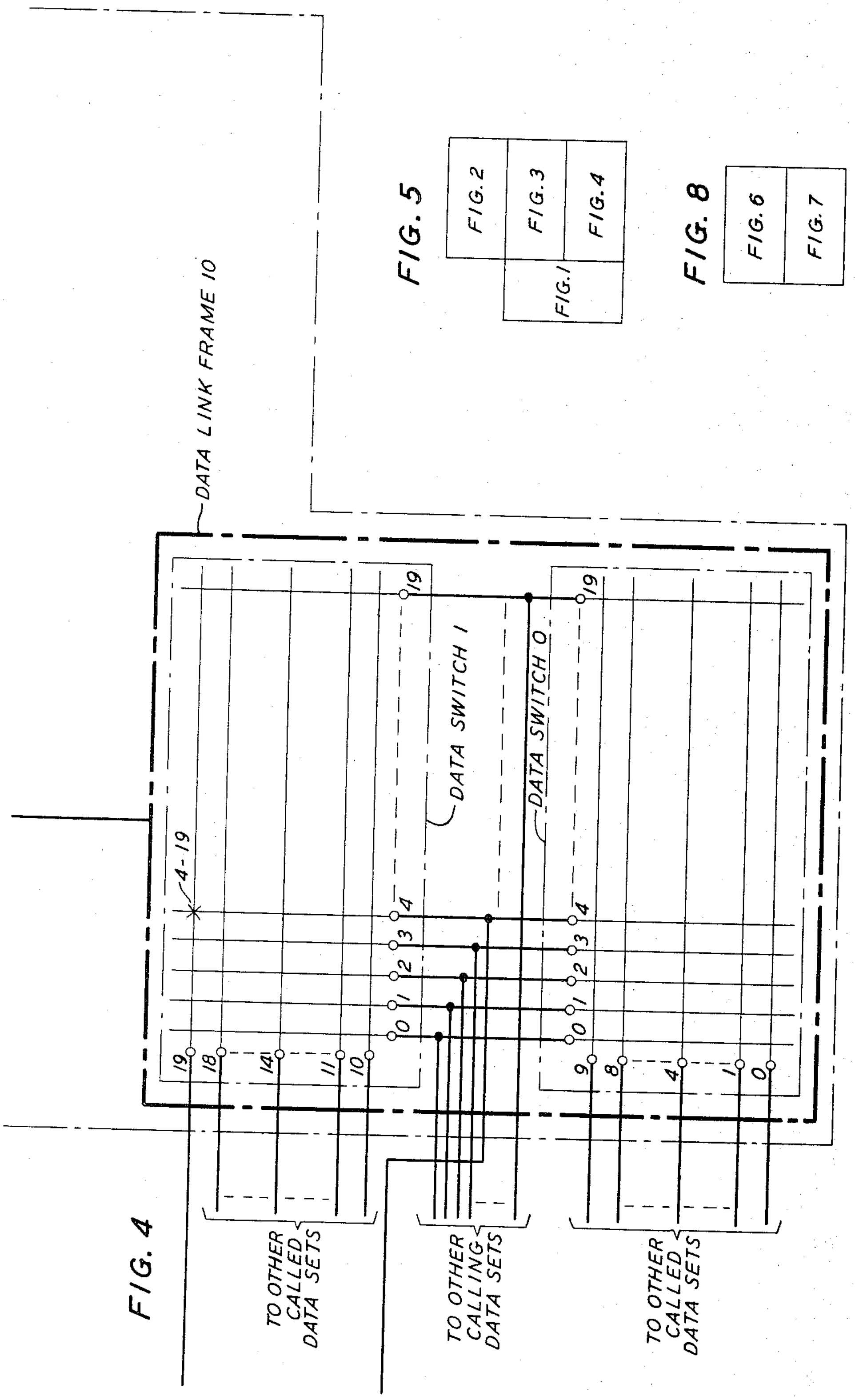
Figure 6:
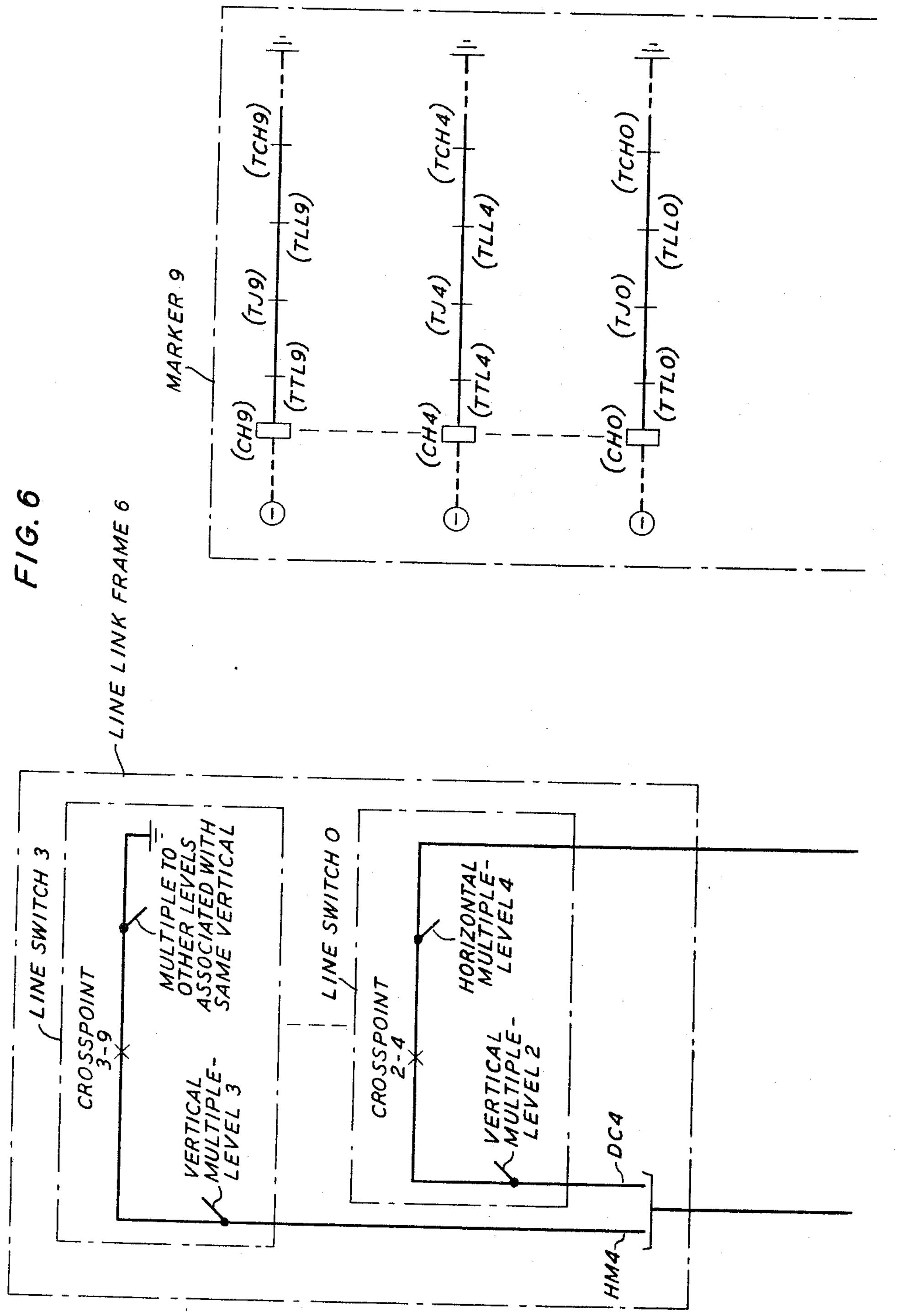
Figure 7:
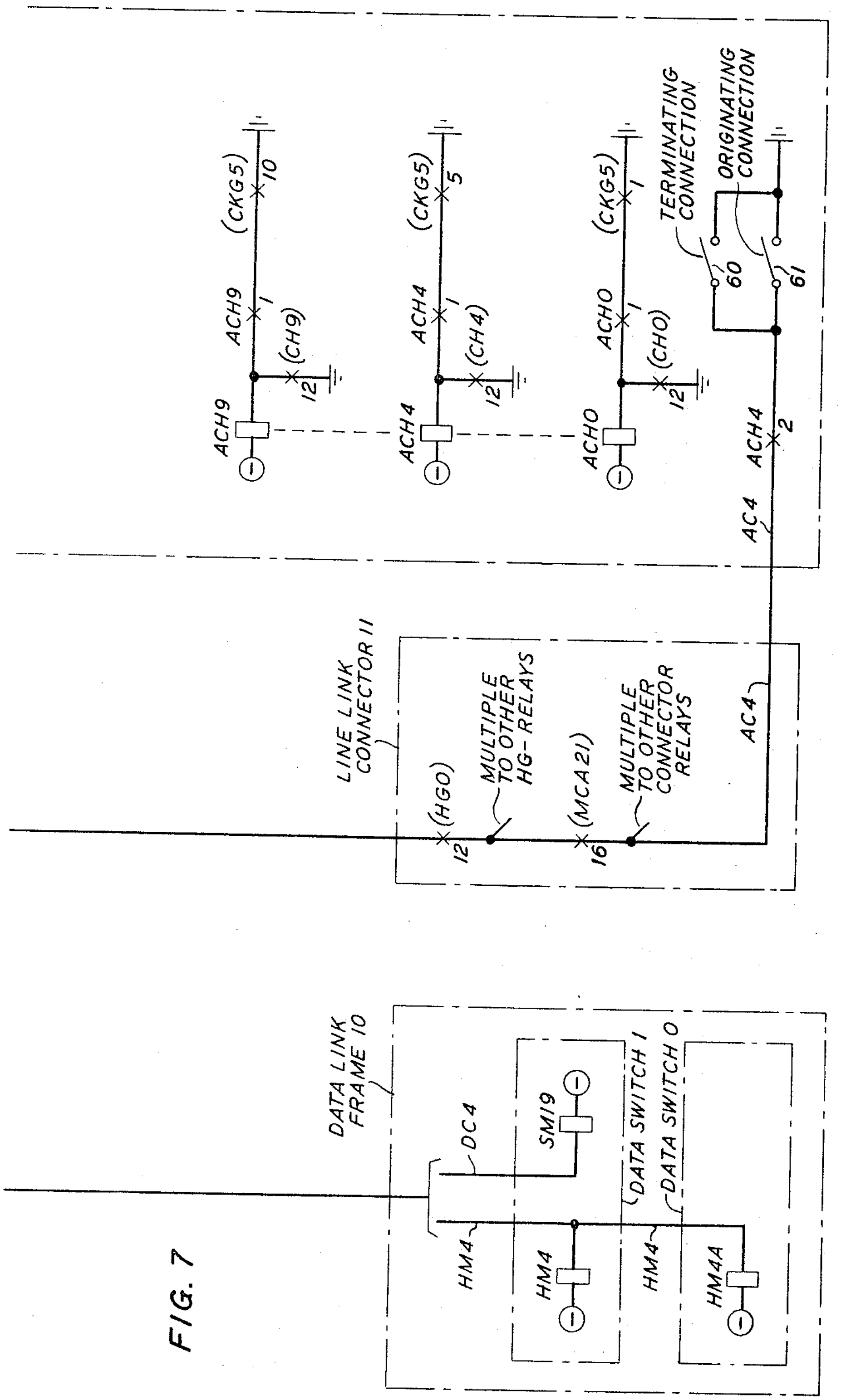
Figure 9:
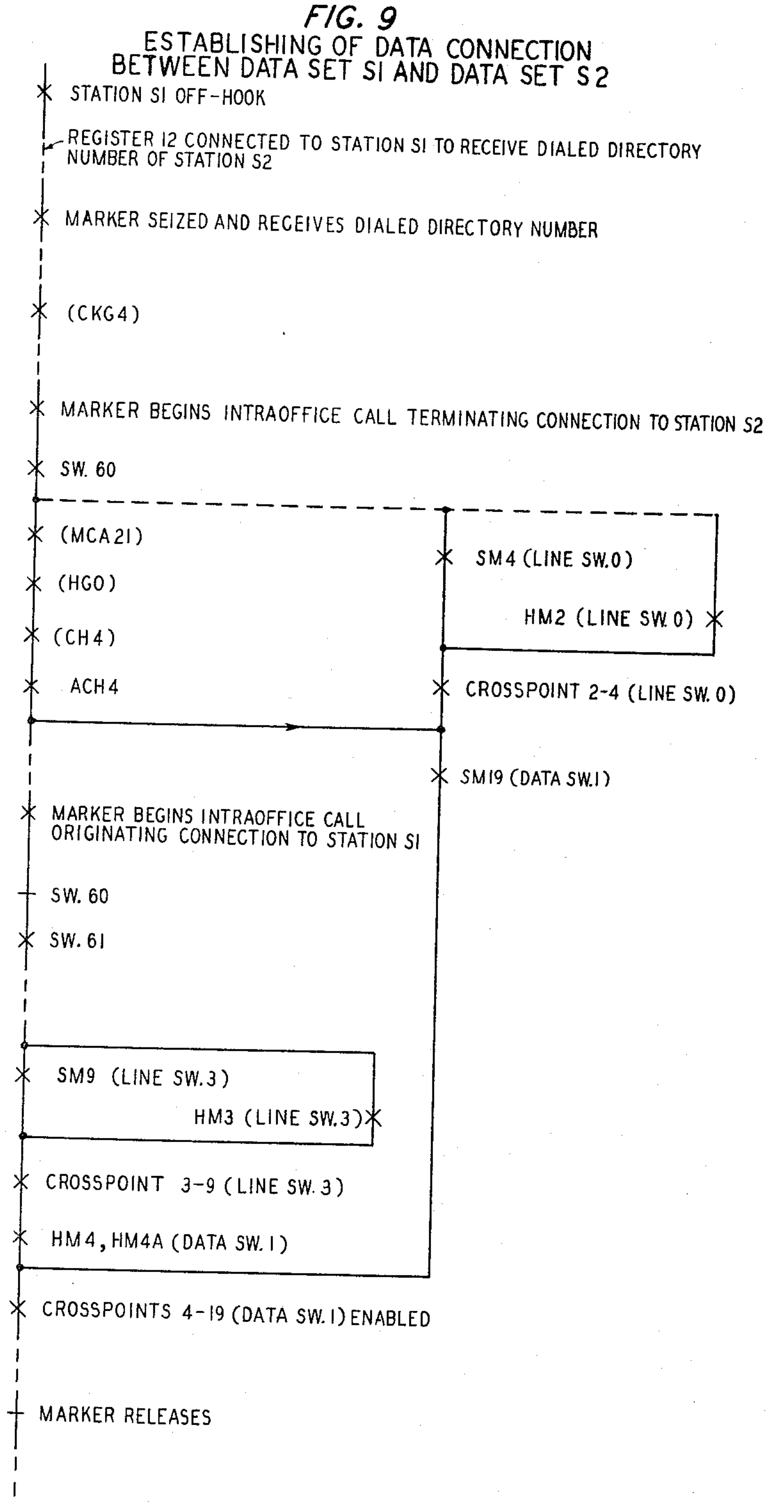
Figure 10:
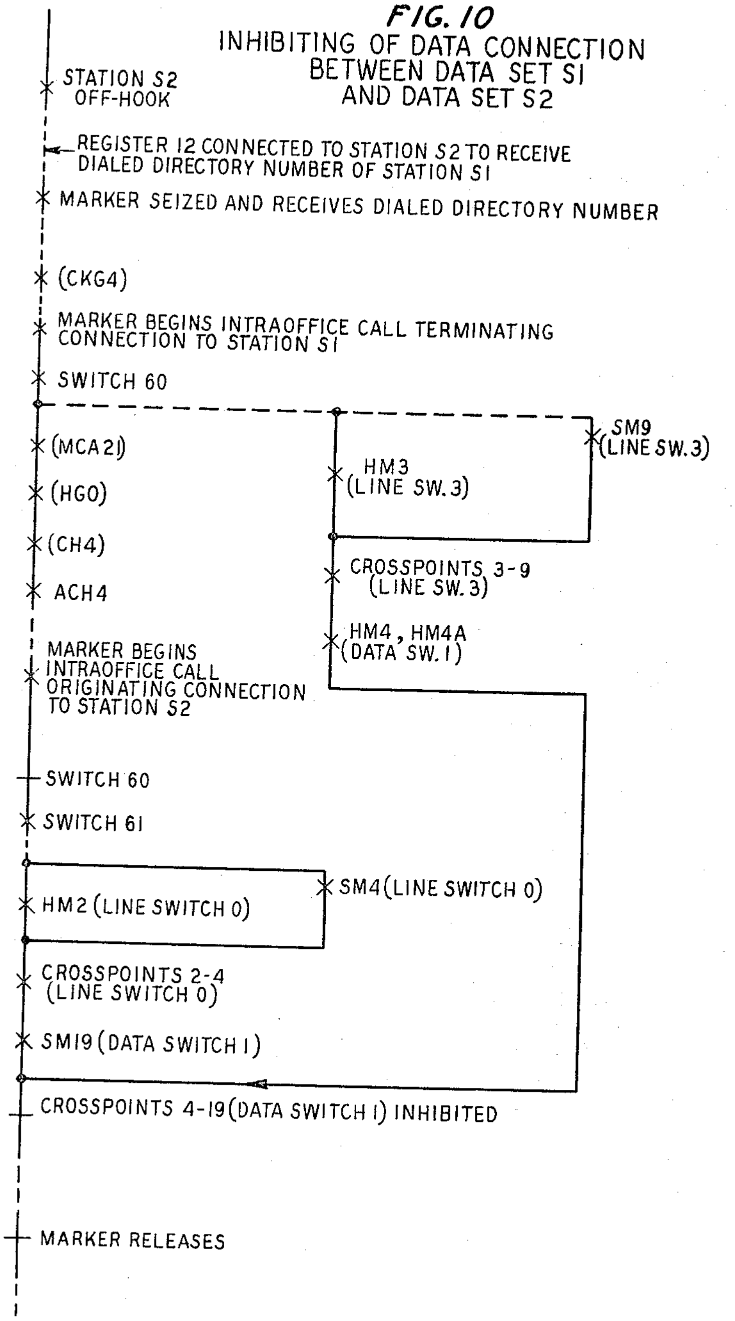

The foregoing objects and features, as well as others, of our invention will be more apparent from a consideration of the subsequent description and the drawing in which:

FIGS. 1 through 4, when assembled as shown in FIG. 5, is a block diagram showing the interrelation of the components of the exemplary embodiment;

FIGS. 6 and 7, when assembled as shown in FIG. 8, is a diagram in schematic form showing in greater detail the interrelation of the components of the exemplary embodiment; and FIGS. 9 and 10 are sequence charts showing the sequence of operation and release of the components of the exemplary embodiment.

It will be noted that FIGS. 6 and 7 employ a type of notation referred to as "detached-contact," in which an "X" represents a normally open contact of a relay, and a "bar," shown intersecting a conductor at right angles, represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol 74, pages 505–513.

The present invention may advantageously be embodied in an automatic switching system, such as the system disclosed in the A. J. Busch Patent 2,585,904, dated Feb. 19, 1952. It is to be understood, however, that our invention is not limited to use in a system of this type but may be used in any switching system.

The invention described herein is particularly concerned with apparatus in line link frame 6, data link frame 10 and marker circuit 9 which are represented by the blocks shown with heavy lines in FIGS. 1 through 4. The other equipment units are neither shown nor described in detail except where necessary for a complete understanding of the invention. The Busch patent may be consulted for a complete understanding of the construction and operation of components not covered in detail herein.

The interrelation and function of equipment units of the exemplary embodiment will now be described with reference to FIGS. 1 through 4, wherein the interconnections between circuit blocks have been designated by means of arrows to show the direction of circuit action.

*General description*

The general description of the embodiment will be facilitated by a brief explanation of the arrangement of line link frame 6 and data link frame 10 as shown on FIGS. 1 through 4.

Line link frame 6 may advantageously be arranged as set forth in the Busch patent, thus comprising a plurality of line and junctor switches. For purpose of explanation, line switches 0 through 9 on line link frame 6 may advantageously comprise six-wire 100 point crossbar switches. Thus, each line switch would have terminated thereon a total of ten subscriber lines, each one individually associated with a specific vertical as set forth in detail in the Busch patent. In the description contained hereinafter, we shall assume that there are a total of 40 special service stations, each station having an independent data set associated therewith. Thus, as shown on FIGS. 2 and 3, line switches 0 through 3 each have terminated thereon a total of ten such stations. As noted earlier, each switch comprises a six-wire crosspoint. As disclosed in detail in the Busch patent, an enabled crosspoint interconnects six wires associated with the vertical unit and six wires associated with the horizontal level, only three of which are required for the communications path within the Busch system. In the description that follows, certain of the other conductors will advantageously be employed to demonstrate the application of the invention.

Referring now to data link frame 10, FIG. 4, it will be noted that two crossbar switches, 0 and 1, respectively, are shown; each crossbar switch comprising a total of 20 verticals and 10 associated horizontal levels. It will be further noted that these switches are arranged such that the 20 verticals of switch 0 are multipled to the 20 verticals of switch 1, and further that the 20 verticals are shown connected to calling data sets, while the total of 20 horizontals are shown as being connected to called data sets. It will thus be obvious from an inspection of the arrangement of crossbar switches 0 and 1 that they comprise, in effect, a 40-by-40 crossbar switch which is operable in the well-known fashion to complete a unique connection between any of the 20 circuits terminated on the vertical units and any other of the 20 circuits terminated on the horizontal levels. It will also be obvious from that which is contained hereinafter that a data connection can only be completed from a data set designated "calling" to a data set designated "called," since the latter is associated with a data switch select magnet, while the former is associated with a data switch hold magnet. While the line crossbar switches on line link frame 6 may advantageously comprise conventional crossbar switches as set forth in the A. J. Busch patent, crossbar switches 0 and 1 on data link frame 10 may advantageously comprise another type of crossbar switches well known in the art, which are specially designed to carry high frequency electrical signals.

Beginning now with the general description of the embodiment, we shall assume for purpose of explanation that an operator at station S1 desires to cause the completion of a voice connection to station S2 and concurrent therewith to cause the completion of a connection between data set S1 and data set S2. The operator at station S1 may, for example, be the individual who has responsibility for the operation of data set S1 and thus station S1 would probably be in proximity to the associated data set. However, it will be apparent from that which is contained hereinafter that the stations are not so restricted, but could, in fact, be located at any point remote from the associated data set.

In order to complete a connection to station S2, the handset is removed from the switchhook at station S1. Accordingly, a connection is completed from station S1 to a dial tone register, such as register 12, appearing on a trunk link frame, such as trunk link frame 7. The manner in which this connection is completed is disclosed in detail in the A. J. Busch patent, beginning in column 6 therein and, accordingly, will not be repeated herein. Upon hearing dial tone, the operator at station S1 dials the directory number assigned to station S2 to thereby cause the completion of an intraoffice connection to station S2 as set forth in detail in the aforesaid A. J. Busch patent beginning in column 62 therein. This intraoffice connection may, for example, be completed through intraoffice trunk 8 to thereby provide a voice communication path between stations S1 and S2.

As further disclosed in detail in the A. J. Busch patent, during the course of completing an intraoffice connection between a calling and a called subscriber, it is necessary to operate the hold magnets respectively associated with each of such stations. In the embodiment, as will be more apparent from that which is contained hereinafter, the resulting closure of the respective crosspoints associated with these hold magnets generates a unique code to thereby cause the closure of a predetermined set of crosspoints on associated data link frame 1 thus causing the completion of a data communication link between data set S1 and data set S2.

As will also be more apparent from that which is contained hereinafter, both the voice communication path and the data communication path are under control of the on-hook or off-hook conditions of stations S1 and S2. For example, upon an on-hook condition of station S1, the associated voice communication path switch train is released thereby causing the release of the associated data transmission switch train. In similar fashion, release of the data path switch train is effected upon an on-hook condition of station S2.

*Detailed description*

The description of the manner in which an intraoffice voice communications path is established between stations S1 and S2 is set forth in detail in the A. J. Busch patent in columns 6 through 104 and is hereby made a part of this specification as though contained in detail herein. Referring to FIGS. 1 through 4, we shall assume that an intraoffice connection has been established from station S1 via line link frame 6, line switch 3, vertical 3, crosspoints 3–9, level 9, through the associated junctors and links to intraoffice trunk 8 on trunk link frame 7, and from intraoffice trunk 8 through the associated junctors and links back to link frame 6 and via level 4 of line switch 0, through enabled crosspoints 2–4 and vertical 2 to station S2. The following description will pertain to circuit action which takes place concurrent with the enabling of the aforedescribed switch train.

In this regard, to facilitate a clear understanding of the embodiment certain relay apparatus designations have been enclosed by parentheses to indicate that the associated relay winding operate path is shown in detail on the aforesaid Busch patent drawings and is not repeated herein. Specifically, the relays so involved and their location in the Busch drawings are as follows:

| Relay designation: | Busch patent Fig. No. |
|---|---|
| CH0–CH4 | 67 |
| CH5–CH9 | 83 |
| CKG5 | 68 |
| TTL0–TTL9 | 82 |
| TJ0–TJ9 | 82 |
| TLL0–TLL9 | 82 |
| TCH0–TCH9 | 81 |
| HG– | 5 |
| MCA21 | 6 |

As set forth in detail in the A. J. Busch patent beginning in column 37, line 18, a (CH0) through (CH9) relay is operated to indicate the level of the line switch which will be used for the communications channel. Referring now to FIGS. 6 and 7, since we have assumed that level 4 of line switch 0 is to be used to complete the connection to station S2, relay (CH4) will be operated at this time. The operation of (CH4) completes the operate path of relay ACH4 through make contact 12 of (CH4) to ground. Accordingly, relay ACH4 operates at this time and locks operated to ground through enabled contact 1 of ACH4, enabled contact 9 of relay (CKG5), and operated switch 60. (The operation of relay CKG5 is described in detail in column 11 of the Busch patent. The significance of switch 60 will be apparent from the description contained hereinafter.) Enabled make contact 2 of relay ACH4 thereupon extends ground over the AC4 lead to line link connector 11 through operated connector relay (MCA21) contacts 16, operated contact 12 of relay (HG0), through operated crosspoints 2–4 on line switch 0, via the DC4 lead to operate select magnet SM19 on data switch 1. Referring to FIG. 1, it will be noted that upon the energization of select magnet SM19 it remains but to operate hold magnet HM4 in order to enable crosspoints 4–19.

The subsequent closure of crosspoints 3–9 on line switch 3 associated with the voice communications path extends positive ground over the HM4 lead to energize the associated hold magnets HM4 and HM4A in parallel on data link switches 0 and 1, selectively. Hold magnets HM4 and HM4A on data switches 0 and 1 operate at this time under control of ground present on the HM4 lead through crosspoints 3–9 on line switch 3.

With the operation of hold magnet HM4 on data switch 1, crosspoints 4–19 are enabled as shown on FIG. 1 to thereby complete a data communication path between stations S1 and S2. It will be noted that the operated condition of hold magnet HM4A on data switch 0 is ineffective to enable the associated crosspoints at this time, since no select magnet is currently enabled on that switch.

Upon completion of the intraoffice voice connection as manifested by the enabled crosspoints 3–9, marker circuit 9 releases as set forth in the Busch patent beginning in column 101 therein.

As further disclosed in detail beginning in column 103 of the Busch patent, upon an on-hook condition of either stations S1 or S2, the associated line switch hold magnets are released thus restoring crosspoints 3–9 to normal. The release of crosspoint 3–9 opens the operate path of hold magnet HM4 on data switch 1, so as to cause the release of crosspoints 4–19 thereby releasing the data communication path between data sets S1 and S2.

From the foregoing description, it is clear that station S1 is enabled to complete both a voice and data connection to station S2 or any other station similarly arranged. It should be noted that station S1 is also operative to cause completion of a connection comprising a voice channel only; namely, by directing a call to a station other than a privileged station having an associated data set. In this latter instance, the associated hold magnets HM4 and HM4A are enabled by the closure of any crosspoint in vertical 3 of line switch 3, but are inoperative to complete a data connection since the associated data switch select magnets are not also currently energized.

In similar fashion, if station S1 directs a connection to another privileged station designated as calling, a situation results wherein, upon completion of the connection, the hold magnets associated with both privileged stations are operated on data link frame 10. However, in this instance also, no data link crosspoints are enabled since no data link select magnet is also currently energized. Therefore, where a voice connection is established between two privileged stations, both of which are designated "calling," an independent data connection is not established.

It may be further noted that, while a voice and data connection will be established as a result of a calling connection from station S1 to station S2, a calling connection to station S1 from station S2 will result in the completion of a voice path only. Referring to FIG. 7, it will be noted that the ground which is extended over the AC4 lead to operate select magnet 19 is extended through switches 60 or 61. Switch 60, which is designated terminating connection, and switch 61, which is designated originating connection, are symbolic representations of apparatus which insure that the AC4 lead will have ground potential applied thereon regardless of whether or not the marker is establishing the terminating connection to the calling line or the originating connection to the called line.

Although the ground is provided independent of whether the connection is being completed from the called line to the intraoffice trunk (terminating connection) or from the calling line to the intraoffice trunk (originating connection), the point in time at which this ground is provided is significant. For example, as shown on FIG. 9, when station S1 completes a calling connection to station S2, crosspoints 2–4 on line link frame 6 are enabled prior to the enabling of crosspoints 3–9 on the same frame. This is true since, as set forth in detail in the Busch patent, the terminating connection to the called line is completed first. Thus, switch 60 is enabled concurrent with the enabling of crosspoints 2–4 to thereby cause the operation of select magnet SM19 on data switch 1. Crosspoints 3–9 are subsequently operated on line link frame 6 during the originating connection established by the marker as set forth in the Busch patent, and extend ground via the HM4 lead to operate hold magnet HM4 on data link frame 10. Consequently, for this sequence of operation crosspoints 4–19 are enabled on data switch 1.

However, where a calling connection is directed from station S2 to station S1, the terminating connection will be completed to station S1 prior to the completion of the originating connection to station S2, since station S2 originated the call. Therefore, as shown on FIG. 10, hold magnet HM4 will be enabled prior to the enabling of select magnet SM19 since the ground extended through switch 61 will be effective to operate select magnet SM19 at a point in time after the operation of hold magnet HM4. As is well known in the art, a crossbar switch crosspoint is enabled only in response to the operation of a select magnet followed sequentially by the operation of a hold magnet. Accordingly, a call directed from a privileged station designated as "called" to a privileged station designated as "calling" does not cause the enablement of a data path therebetween, although a voice path will, of course, be established.

*Conclusion*

While the equipments of this invention have been described with reference to a particular embodiment in an arrangement wherein a data connection is established through an auxiliary crossbar switch field in response to the establishment of a voice connection through a primary crossbar switch field, it is to be understood that such an embodiment is intended to be illustrative of the present invention and that numerous other arrangements may be devised by those skilled in the art without departing from the spirit and scope of the invention.

For example, certain data sets connected to the auxiliary field may be designated as both "calling" and "called" and associated with two telephone directory numbers one operable to render the data set available in a calling capacity and the other operable to render the data set available in a called capacity.

What is claimed is:

1. An automatic switching system comprising a plurality of substation means operable to concurrently receive audio frequency signals and high frequency signals,
first switching means for extending audio frequency connections between said substation means,
second switching means for extending high frequency connections between said substation means, and
means responsive to extension of a connection by said first switching means between a calling and called substation means for generating a coded pattern of control signals effective for controlling said second switching means to extend a concurrent high frequency connection between said calling and called substation means.

2. An automatic switching system comprising a first group of lines,
a second group of lines,
a primary switching array for extending connections between lines in said first group,
an auxiliary switching array for extending connections between lines in said second group, and
means responsive to the enabling of a connection between certain of said lines in said first group for enabling a connection between related ones of said lines in said second group.

3. The combination set forth in claim 2 wherein said primary switching array and said auxiliary switching array each comprise a grid network, and
said grid networks each comprise a plurality of vertical connecting means and a plurality of horizonal connecting means.

4. The combination set forth in claim 3 wherein specified ones of said primary grid netwrok vertical connecting means are each exclusively associated with one of said lines in said first group,
wherein said auxiliary grid network vertical connecting means are each exclusively associated with certain ones of said lines in said second group, and
said auxiliary grid network horizontal connecting means are each exclusively associated with the other ones of said lines in said second group.

5. The combination set forth in claim 3 wherein said grid networks each comprise a plurality of crossbar switches.

6. A switching system comprising a switching office,
a first group of lines connected to said switching office,
a second group of lines connected to said switching office,
first switching means for extending connections between lines in said first group,
second switching means for extending connections between lines in said second group,
common control means controlled by a calling line in said first group for enabling said first switching means to complete a calling connection to a called one of said lines in said first group, and
means responsive to the establishment of said calling connection for generating a coded pattern of control signals for enabling said second switching means to extend a data connection between a calling and a called line in said second group.

7. The combination set forth in claim 6 wherein said first switching means comprises a plurality of connecting means each exclusively associated with said lines in said first group, and
said coded pattern of control signals comprises a plurality of signals generated by the sequential enabling of said connecting means.

8. The combination set forth in claim 6 further comprising means responsive to the release of said calling connection for releasing said data connection.

9. An automatic switching system comprising a first group of lines,
a second group of lines,
a first crossbar switch field for extending connections between lines in said first group,
a second crossbar switch field for extending connections between lines in said second group,
common control means comprising a marker controlled by a calling line in said first group for completing a calling connection to a called one of said lines in said first group, and
switching means responsive to the establishment of said calling connection for generating a coded pattern of control signals for enabling said switching means to extend a connection between a calling line and a called line in said second group.

10. The combination set forth in claim 9 wherein said first crossbar switch field comprises a plurality of hold magnets each exclusively associated with one of said lines in said first group, and
said switching means comprises contact means controlled by the sequential operation of the hold magnets associated with said calling line and said called line for determining said coded pattern of control signals.

11. The combination set forth in claim 10 wherein said first crossbar switch field further comprises a plurality of select magnets associated with said hold magnets, and
said contact means comprises a pair of crosspoint contacts sequentially operative in response to the enabling of one of said select magnets and the hold magnet associated with said called line followed by the operation of another of said select magnets and the hold magnet associated with said called line.

12. The combination set forth in claim 11 wherein said second crossbar switch field comprises a plurality of hold magnets and a plurality of select magnets,
said hold magnets each exclusively associated with certain ones of said lines in said second group and said select magnets each exclusively associated with the others of said lines in said second group, said switching means further comprising a pair of conductors each exclusively associated with one of said crosspoint contacts and connected to said second crossbar switch field select magnet and said second crossbar switch field hold magnet, respectively, and a source of electrical potential connectible to said conductors in response to the enabling of said crosspoint contacts.

13. The combination set forth in claim 9 wherein said common control means is operative upon release of said calling connection to complete another calling connection from said called line in said first group to said calling line in said first group, and means responsive to the establishment of said other calling connection for inhibiting said second switching means from extending a data connection between said calling and said called line in said second group.

14. An automatic switching system comprising a plurality of calling substations and a plurality of called substations, a plurality of data sets individual to said substations, first switching means for extending speech connections originating at said calling substations between said calling and called substations, second switching means for extending data connections between said corresponding data sets, means responsive to the extension of a connection by said first switching means form a particular calling to a called substation to generate a coded pattern of signals for governing said second switching means to extend a data connection between said corresponding data sets, and means connected to said second switching means for inhibiting the extension of data connections therethrough in response to connections through said first switching means originating at said called substation.

15. An automatic switching system in accordance with claim 14 wherein said first switching means includes a coordinate switching network array and said second switching means includes a coordinate switching network array effective for transmitting signals at frequencies higher than the signals transmitted through said first switching means.

References Cited

FOREIGN PATENTS 1,110,242 7/1961 Germany.

JOHN W. CALDWELL, *Acting Primary Examiner.*

J. T. STRATMAN, *Assistant Examiner.*